(12) United States Patent
Major et al.

(10) Patent No.: US 11,611,786 B2
(45) Date of Patent: Mar. 21, 2023

(54) INTELLIGENT ASSIGNMENT AND DATA MANAGEMENT OF STORED MEDIA CONTENT

(71) Applicant: Sling TV L.L.C., Englewood, CO (US)

(72) Inventors: Robert Drew Major, Orem, UT (US); Leo Davis, Englewood, CO (US); Howard Davis, Englewood, CO (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 17/852,808

(22) Filed: Jun. 29, 2022

(65) Prior Publication Data

US 2022/0417570 A1  Dec. 29, 2022

Related U.S. Application Data

(60) Provisional application No. 63/216,461, filed on Jun. 29, 2021.

(51) Int. Cl.
*H04N 21/239* (2011.01)
*H04N 21/231* (2011.01)
*H04N 21/274* (2011.01)

(52) U.S. Cl.
CPC ... *H04N 21/2396* (2013.01); *H04N 21/23113* (2013.01); *H04N 21/274* (2013.01)

(58) Field of Classification Search
CPC ......... H04N 21/2396; H04N 21/23113; H04N 21/274
See application file for complete search history.

(56) References Cited

U.S. PATENT DOCUMENTS

| | | | | |
|---|---|---|---|---|
| 2013/0145415 A1* | 6/2013 | Major | ............. | H04N 21/47217 725/110 |
| 2014/0165116 A1* | 6/2014 | Major | ................ | H04N 5/765 725/89 |
| 2014/0189754 A1* | 7/2014 | Major | ............... | H04N 21/6405 725/67 |

\* cited by examiner

*Primary Examiner* — Nicholas T Corbo
(74) *Attorney, Agent, or Firm* — KW Law, LLP

(57) ABSTRACT

A remote storage digital video recorder (RSDVR) retains multiple copies of media programs so long as the copies are expected to be useful to at least one user. Rather than assigning copies to specific users at the time the program is recorded, copies can be assigned as the users request access to the particular media programs. Copies of unassigned programs can be deleted according to a schedule to reduce disk storage and processing demands on the system. A pool of program copies that are not initially assigned to particular users can be maintained until the user makes a specific request to view the program. This "late assignment" of program copies can substantially reduce the amount of data stored by the RSDVR system without substantially impacting the viewer experience.

17 Claims, 2 Drawing Sheets

INTELLIGENT ASSIGNMENT AND DATA MANAGEMENT OF STORED MEDIA CONTENT

PRIORITY CLAIM

This application claims priority to U.S. Provisional Application Ser. No. 63/216,461 filed on Jun. 29, 2021, which is incorporated herein by reference.

TECHNICAL FIELD

The following discussion generally relates to remote storage digital video recorders (RSDVRs) that record media content for subsequent viewing over the Internet or another digital network.

BACKGROUND

Digital video recorders (DVRs) are becoming increasingly popular with television viewers. While viewers of the past generally had to watch their television content at the time that the content was broadcast, DVRs allow viewers to "time shift" their content viewing to more convenient times after the broadcast has already occurred, or even while the broadcast is ongoing. In addition to the convenience of time shifting, most DVRs allow trick play functions such as fast forward, rewind and pause that are not generally available from a live broadcast. Due to the additional conveniences provided, many, if not most, television viewers now prefer the viewing experience provided by the DVR to that provided by a live broadcast.

Local storage digital video recorders (LSDVRs) are commonly found in homes, places of business and the like. These devices typically record programs received via a cable, satellite, network or terrestrial broadcast for subsequent viewing by an owner of the device. LSDVRs are often incorporated into set top boxes (STBs) used to receive cable or digital broadcast satellite (DBS) broadcasts. Other LSDVRs can be used to record terrestrial broadcasts or other content as desired. One example of an LSDVR used to record broadcast television content is described in WIPO Publication WO2020/049593.

In recent years, remote storage digital video recorders (RSDVRs) have been more widely deployed. These modern DVR devices make use of cloud computing resources to store media content at a centralized location so that users can later access the content remotely via the Internet or another digital network. RSDVRs provide for centralized management and efficient delivery of streaming media to large numbers of simultaneous users. Moreover, media storage "in the cloud" frequently provides more convenient access to stored media content from any number of different devices and locations.

Managing a centralized RSDVR system, however, can present numerous challenges, particularly when the system is used by many simultaneous users. It can be a particular challenge to simultaneously record large numbers of copies of the same program, for example, and to manage the various copies across multiple users. At the very least, the amount of disk or other mass storage required to maintain multiple copies of multiple programs recorded by multiple users can be substantial. This problem is compounded by modern adaptive media streaming techniques that typically encode each media program at different bitrates (or other quality levels) to accommodate different client devices across a multitude of ever-changing networks. Several examples of adaptive streaming techniques are described in U.S. Pat. No. 7,818,444, although other techniques, processes and systems could be equivalently used.

It is therefore desirable to create systems, devices and automated processes that can improve the management of stored media content in a remote storage digital video recorder.

BRIEF SUMMARY

Various embodiments relate to automated processes, computing systems, devices and other aspects of a remote storage digital video recorder (RSDVR) in which multiple copies of a media program are retained so long as they are expected to be useful to at least one user, but otherwise removed to reduce disk storage and processing demands on the system. Additional embodiments can record a pool of program copies that are not initially assigned to particular users until the user makes a specific request to view the program. This "late assignment" can substantially reduce the amount of data stored by the RSDVR system without substantially impacting the viewer experience.

In one example, the RSDVR system executes an automated process under the direction of software and/or firmware instructions that are stored in a non-transitory data storage for execution by one or more processors. The automated process suitably allows for an initial determination of a number of copies of a media program to be recorded for later viewing by the various viewers. Rather than assigning specific copies to specific viewers at the time of recording, however, the system can perform a "late assignment" of one or more program copies on an as-needed basis. That is, copies are not initially assigned to a specific viewer until the viewer indicates a desire to actually view the content. At viewing time, the RSDVR assigns a specific copy of the desired program to the viewer from the pool of available copies. This allows for more efficient allocation of program copies to only those users who actually view the program, thereby potentially conserving storage, processing time, bandwidth and other resources that would have otherwise gone to recording copies of programs that may never be viewed.

Some embodiments may additionally or alternately delete the pooled copies as their likelihood of usefulness diminishes. That is, as time passes after the initial recording, the number of viewers who remain interested in the program usually diminishes. This reduced interest can allow the RSDVR system to delete one or more pooled (but unassigned) copies of the program, thereby freeing up resources without substantial risk of a viewer losing access to a program that is actually desired.

Some example embodiments provide a network server system that delivers recorded media programs to a plurality of viewers, the system comprising a processor, non-transitory data storage and an interface to a network. The non-transitory data storage suitably comprises computer-executable instructions that, when executed by the processor, perform an automated process. The automated process suitably comprises: recording an initial number of copies of a media program for storage by the network server system; after the initial number of copies of the media program have been recorded, subsequently receiving requests from at least some of the viewers to view a copy of the media program; assigning, in response to each of the subsequently-received requests, one of the previously-recorded copies to the viewer making the request to thereby permit access to the assigned copy of the media program by the viewer; and subsequently deleting at least some of the previously-recorded copies of the media program that are not yet assigned to any of the plurality of viewers.

Other embodiments provide an automated process performed by a remote storage digital video recorder (RSDVR) system comprising a non-transitory data storage, a processor and an interface to a network. The automated process suitably comprises: initially determining a number of copies of a media program to be recorded for later viewing by a plurality of viewers having access to the RSDVR system; storing the number of copies of the media program in a pooled arrangement by the RSDVR system, wherein individual copies of the media program are not assigned to a specific viewer at the time of storage; after the number of copies are stored, subsequently responding to requests from the plurality of viewers, wherein the requests indicate a desire to obtain access to a copy of the media program stored by the RSDVR system; and responding to each of the requests by performing, by the RSDVR system, a late assignment in which one of the copies in the pooled arrangement is assigned to the viewer making the request to thereby provide the viewer with access to the assigned copy of the media program.

Various embodiments may provide additional systems, devices and automated processes as set forth herein.

DRAWING FIGURES

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, a remote storage digital video recorder (RSDVR) system creates a "pool" of program copies that can later be assigned to specific users for playback. Users that request program recordings will always have a unique copy of the recording that is available to them, but the total number of recordings made by the RSDVR system can be reduced in expectation that at least some viewers will not use the recordings that they have requested. Moreover, the likelihood that a recorded copy will go unused typically increases with time following the initial broadcast of the program, so the RSDVR system can proactively delete at least some of the unassigned copies over time to free up resources. Alternatively, the RSDVR system can delete only certain versions of a copy (e.g., higher or middle quality program streams) while retaining at least one other version of the copy, thereby reducing the need for storage space over time. These basic concepts may be adapted and expanded in any number of equivalent embodiments, some of which are described herein.

Figure 1:
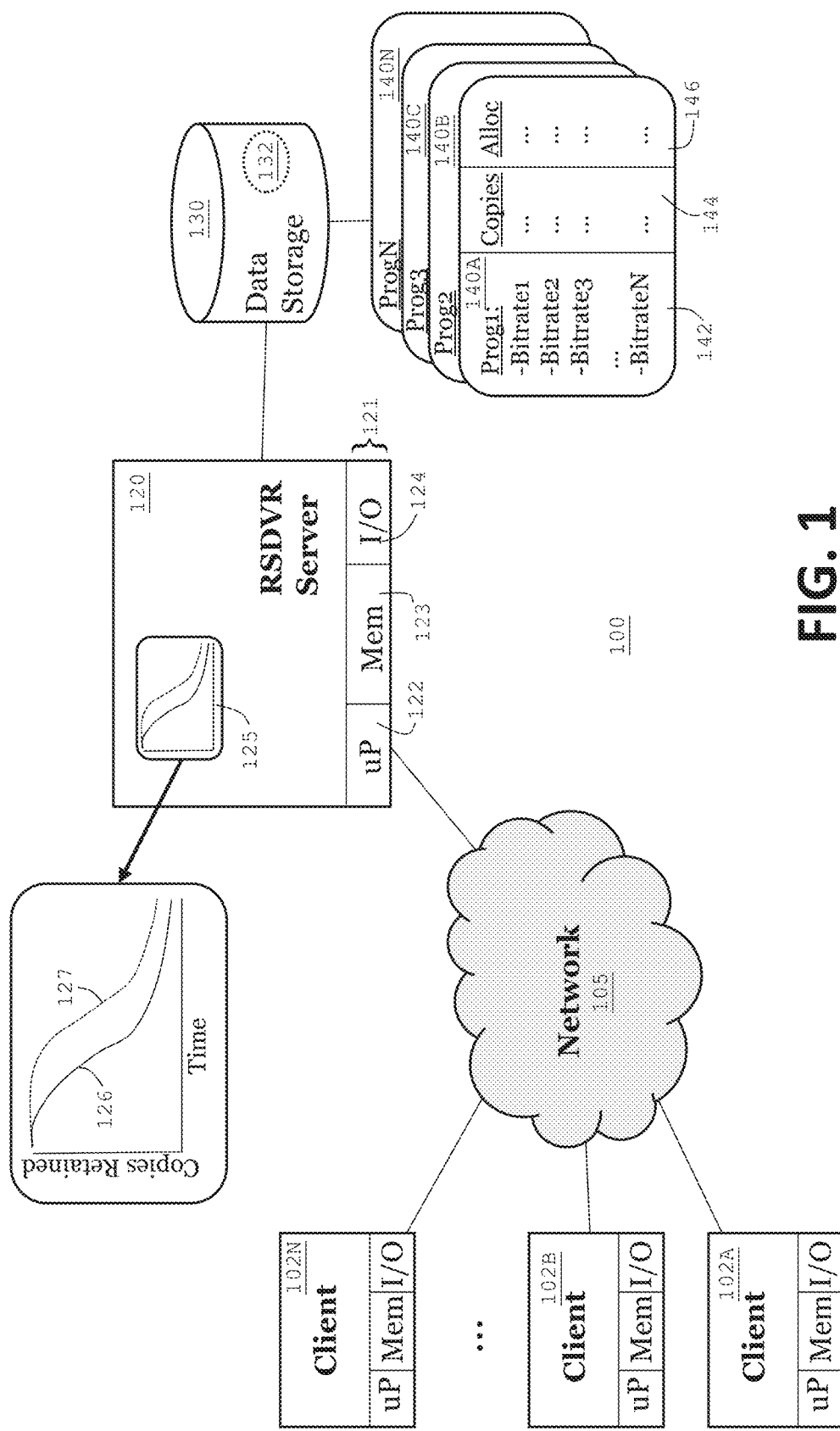
FIG. 1 is a diagram showing an example of an RSDVR system that performs intelligent assignment and/or retention of media content stored in a data storage.

With reference now to FIG. 1, a data processing system 100 for managing recordings of media content suitably includes an RSDVR server system 120 that communicates with any number of client devices 102A, 102B, . . . , 102N via a network 105. Users of client devices 102A-N typically interact with the RSDVR system 120 to direct the recording of television broadcasts or other media, and to receive digitally encoded copies for playback at a later time. RSDVR system 120 receives and records the selected programs 132 in a data storage 130. The various copies of the various programs recorded may be described in metadata 140A-N that is processed by RSDVR system 120 to assign copies to various users of system 100, and to perform intelligent deletion of program copies as set forth herein.

Client devices 102A, 102B, . . . , 102N represent any type of computing device that is capable of communicating with RSDVR system 120 via network 105 to direct the recording and playback of media programs. Typically, client devices 102A-N include conventional computing hardware (e.g., one or more processors, memory and input/output interfaces) performing the various functions described herein under the direction of software and/or firmware that is stored on the device 102 and executed by the processor of the device. Examples of client devices 102A-N could include personal computers, mobile phones, tablet computers, media players, set top boxes, video game players and the like. Client devices 102A-N are typically consumer-type devices operated by particular users, subscribers or viewers of content, as appropriate. In many implementations, users of client devices 102A-N create accounts with RSDVR system 120 so that RSDVR system 120 can be accessed from multiple different user devices 102, as appropriate.

Network 105 is any public and/or private network capable of supporting digital communications as described herein. In various embodiments, network 105 includes the Internet, a mobile phone network, a wireless or wired local area network, and/or the like. Generally speaking, network 105 operates using TCP/IP or similar protocols that support peer-to-peer and client/server interactions as desired.

RSDVR system 120 is a network-based computing system built upon computing hardware 121 that includes one or more processors 121, memory or other non-transitory data storage 122, and appropriate input/output interfaces 123. The hardware 121 typically operates under the direction of an operating system (e.g., any version of the LINUX operating system or the like), which in turn supports one or more application programs 125 for receiving content, interacting with client devices 102, managing recording and allocation of program copies, encoding and delivering recorded content, and/or any other functions that may be desired.

In the example of FIG. 1, RSDVR system 120 interacts with a disk array or other non-transitory mass storage 130 to store recorded programs for subsequent access and retrieval. Storage 130 is typically a high capacity mass storage that includes any number of disk drives or similar magnetic media, although other embodiments could make use of solid state, optical and/or other non-transitory storage media as desired. U.S. Pat. No. 9,601,153 provides one example of a system for intelligently storing and retrieving media content in an RSDVR system, although other embodiments could use other components and techniques as desired.

As media programs are received by RSDVR system 120, any number of recordings can be made to support subsequent retrieval and viewing by any number of client devices 102. Programs may be received via satellite, via digital network connections, via terrestrial broadcasts, or via any other source. Program copies 132 are stored in data storage 130 for subsequent retrieval and transmission to client devices 102A-N. Program copies may be encoded or transcoded for transmission in any manner. In some embodiments, encoding/transcoding takes place after initial storage but prior to the user request for playback. Other implementations may perform live encoding during playback (e.g., placeshifting), if desired.

As noted above, various embodiments allocate specific copies of the stored programs 132 to viewers when the programs are requested for viewing, rather than at the time of initial storage. Although each user retains its own unique copy of the recorded program, the late binding reduces waste by reducing the number of requested-but-never-used copies. If a hundred users create recording timers or similar requests for the same program, for example, it can be expected that only 40% or so of those users will actually watch the program recording. If RSDVR system 120 were to record only fifty copies for the one hundred users, then, it will still have an adequate number of program copies to provide a unique copy to every user who actually watches the program. But the wasted resources (disk space, encoder resources, electric power, etc.) previously used to store one hundred separate copies of the same program can be reduced.

Even further, it is reasonable to expect that the demand for the program will diminish in the hours, days, weeks and months following the initial broadcast. That is, viewers become less likely to watch recorded programs as the time following the broadcast increases. The graph shown in FIG. 1 shows that the number of needed copies suitably diminishes over time as viewers either watch the program, or lose interest. Moreover, it is reasonable to expect that viewings on home based media devices such as media players and STBs (shown in curve 126) tend to diminish more quickly than viewings on mobile devices (shown in curve 127). It can therefore be reasonable to delete the higher quality (e.g., 4k) copies used by home-type devices before deleting lower-quality copies typically used by smaller-screen devices such as mobile phones and tablets.

In the example of FIG. 1, each of the programs 132 stored in data storage 130 is described by metadata 140A, 140B, 140C, . . . , 140N, with each program having its own metadata 140. In this example, each program will have a determined number of copies 144 that may be allocated 146 to specific user accounts associated with client devices 102 as needed. In a conventional RSDVR system, each copy of each program is assigned to a particular user account or device 102 when the recording is created. The number of copies made, then, is typically based upon the number of recording timers that have been set. Each viewer that created an a priori recording timer for the program will generally have its own allocated copy of the program, regardless of whether the program copy is ever actually viewed by the user. As noted above, this creates substantial waste of storage capacity and computing resources since many (or even most) of the recordings that are made will never be used.

Various embodiments therefore maintain the copies 135 in storage 130 as unassigned until the program is actually requested by a user of a client device 102. When the program is requested, then a copy of the program 135 can be assigned to that user by updating metadata 146, thereby preventing re-assignment of the same copy to another user. The allocated copy may also be retained from subsequent purging, if desired.

As noted above, adaptive media streaming often makes use of multiple encodings of a program to accommodate different types of client devices 102, evolving network conditions, and the like. To that end, may RSDVR systems 120 maintain multiple copies of each program that are each encoded with different bitrates, frame rates, resolution and/ or other quality parameters as appropriate. This allows high quality streaming to more powerful devices having high bandwidth connections (e.g., a home media streaming device having access to a broadband connection) as well as lower quality streaming to smaller devices and/or devices with less bandwidth available (e.g., mobile devices with small screens operating over lower bandwidth mobile connections). In addition to maintaining multiple copies of each recorded program, then, many embodiments also store additional copies 144 corresponding to the same program encoded at different quality. The recorded copies 132 in data storage 130, then, include not only many copies of the same program, but also many sub-copies of the program (i.e., copies of the copy) encoded at multiple quality levels. Often, each program copy is stored with 5-10 different quality levels, although other embodiments will use different numbers as desired. But storing each copy of the program at multiple quality levels greatly increases the space needed in data storage 130.

Various embodiments therefore remove certain quality levels from storage over time, thereby reducing space consumed by the unused quality levels. Some implementations may retain certain quality levels while deleting others, thereby still allowing access to the program copy, albeit potentially at a less-than-optimal quality level. The greatest space savings will occur if the highest quality levels are removed, but substantial savings can still be realized if intermediate quality levels are removed while retaining the higher levels. As shown in the graph in FIG. 1, mobile content 127 may remain in demand longer than home-based content 125, so it may be desirable to maintain more copies of the lower quality encodings for a longer time than the higher quality encodings, if desired. Metadata 140 indicates that different programs may be stored with multiple copies 144, each copy having multiple quality levels 142. To that end, different quality levels may be marked 146 for late allocation, if desired. Similarly, unallocated quality levels may be deleted at a later time to free up space in data storage 130, as appropriate.

Figure 2:
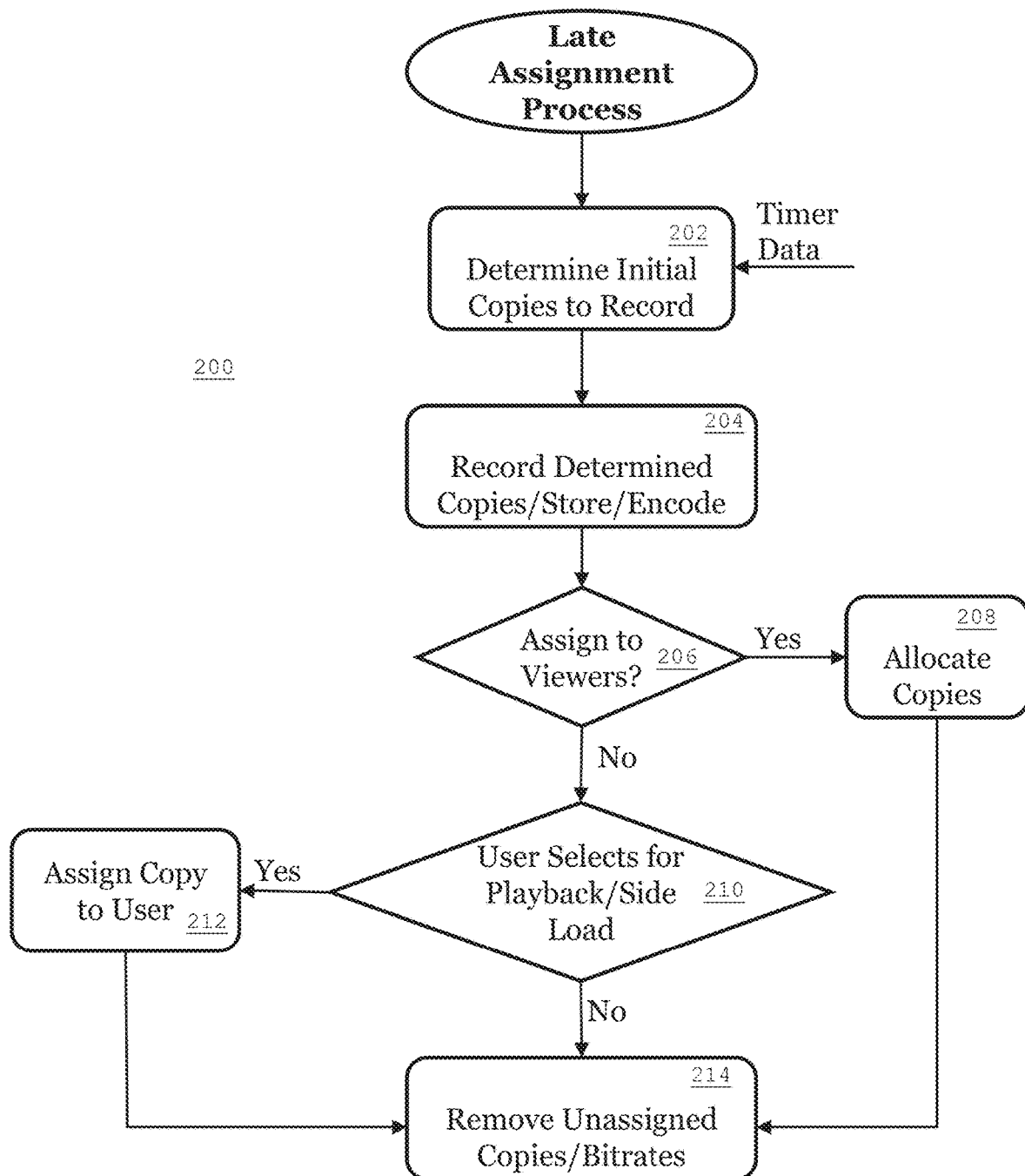
FIG. 2 is a flowchart of an example process performed by a RSDVR system for intelligently managing the assignment and/or retention of media content stored in a data storage.

FIG. 2 shows an example of an automated process 200 performed by RSDVR system 120 to intelligently allocate program copies amongst users of the system 100, and to intelligently delete unallocated copies over time. Process 200 as illustrated in FIG. 2 includes the broad functions of determining an appropriate number of recordings to make (function 202), assigning the different copies to viewers (functions 206, 208, 210, 212), and removing unused copies over time as warranted (function 214). The various functions shown in FIG. 2 may be performed by software or firmware instructions stored in memory 123 and executed by processor 122, as desired. Equivalent embodiments may include additional functions to those shown in FIG. 2, and/or may arrange the various functions in another manner.

The number of initial copies to be made for each media program may be determined in any manner (function 202). In various embodiments, the number of copies may be based upon the number of system users who have set recording timers for the program. This number may then be scaled back based upon previously-observed user behavior, statistical analysis or the like, to account for copies that will never be viewed. If a program is known to have a watch rate of approximately 50%, for example, then it may be desirable to create copies for 60-75% of the users who have set timers to ensure an adequate supply of copies, although other percentages could be equivalently used depending upon the particular implementation. Some embodiments may adjust the scaling factor based upon particular programs or networks, noting that some programs will inevitably have higher watch rates than other programs. Different programs, then, may have different numbers of copies recorded and different scaling percentages, as desired.

When the program is broadcast, the RSDVR system 120 suitably creates the desired number of program copies for storage in storage device 130 (function 204). As noted above, program content may be received via terrestrial broadcasts, network streams, file transfers, satellite and/or cable broadcasts, in any other manner, and/or in any combination thereof. Content is appropriately stored in the data storage for subsequent retrieval and viewing by users of client devices 102.

Various embodiments may perform immediate assignment of certain copies, if desired, to guaranty that certain users will have a dedicated copy of the program (function 208). Copies may be immediately assigned to the viewers who are most likely to actually view the program, as determined in any manner. Viewers who have viewed prior episodes of the program, for example, may be more likely to watch new episodes of the same program. Viewers belonging to certain demographics may be more likely to watch certain programs. Timers created just before broadcast tend to be watched more often than timers set further in advance of the broadcast. Some or all of these factors may be considered, along with any factors as desired. Allocation will typically involve updating the metadata 146 associated with that particular copy to indicate that the copy is associated with a particular user, and is therefore not available for further allocation.

But a more efficient way to allocate copies 132 of programs stored in data storage 130 is to perform a "late assignment" when a particular user requests playback (or another action, such as side loading) with regard to the program (function 210). When the user request access to program content, RSDVR system 120 suitably chooses an unassigned copy 132 of the requested program and updates the associated metadata 140 to indicate that the copy is now allocated to that particular user (function 212). That copy is then removed from the pool of "available" copies, and may also be prevented from automatic deletion, as desired.

If the pool of unallocated copies becomes depleted, RSDVR system 120 may take any appropriate action. That is, if all of the available copies are assigned to other users when a new user request is received, the RSDVR system 120 will need to take other action. In some implementations, the user will simply be notified that the copy is not available. Further embodiments may direct the user to a streaming source for the same content, and/or take other actions as desired. It may also be beneficial to update the future recording/retention plan for the same program (or similar programs) to prevent similar shortages in the future. Some embodiments may be able to fill subsequent user requests with only recordings having lower quality, or that are otherwise available even if the full range of different quality levels is not available.

Unallocated copies 132 of programs can be removed on any temporal basis (function 214). As noted above, it is generally known that programs are most watched in the hours and days immediately following the broadcast, and that many viewers are less likely to watch recorded programs as they age in storage. To that end, some of the unallocated copies 132 can be deleted from storage device 130 according to any schedule. Deletion schedules may vary from program to program, and may be adapted based upon demand for the program over time. That is, if the demand for a program in the days following broadcast is greater than expected, then the deletion schedule may be tempered back to prevent a shortage of copies. Conversely, the deletion schedule may be made more aggressive if observed conditions warrant.

As noted above, the late assignment and scheduled deletion of copies may be equivalently applied to certain quality levels. This is particularly true if the copies are transcoded into multiple sub-copies having different quality levels prior to the late assignment to a particular viewer. Substantial storage space can be freed up over time by simply removing one or more encoded quality levels of one or more copies, even if the other quality levels are retained. While the missing quality levels can adversely impact playback in some instances, this effect can be reduced by intelligently deleting the least used quality levels for that program and/or by deleting intermediate quality levels so that "good" playback is still available when conditions warrant, while retaining "lower" quality levels to guaranty at least some playback even under the most adverse conditions. The particular quality levels that are retained or deleted may vary from program to program, and may be adapted over time based upon observed data, statistical analysis and/or the like.

In one embodiment, initial copies of a media program can be made based upon the number of recording timers set, and/or any other information. Some of the unassigned copies may transcoded into one or more sub-copies having different encoding qualities, if desired. As time passes, one or more of the sub-copies can be deleted, recognizing that the deleted sub-copy may not be needed. Indeed, if a lower quality level is deleted while a higher quality level is retained, it may be possible to re-transcode the desired level from the higher quality copy. Conversely, if the higher quality sub-copy is deleted, then playback may not be available at the highest quality, but nevertheless possible using the lesser quality sub-copy. In still further embodiments, initial copies of a received program may be assigned to specific viewers at broadcast or recording time, but transcoded sub-copies may not be assigned until later. This would allow each user to have a guaranteed copy, without requiring each copy in the system to have a full set of sub-copies for every possible quality level. The basic concepts set forth herein may therefore by modified or supplemented in any manner.

A network media recording system therefore comprises several data processing components, each of which are patentable, and/or have patentable aspects, and/or having processing hardware capable of performing automated processes that are patentable. This document is not intended to limit the scope of any claims or inventions in any way, and the various components and aspects of the system described herein may be separately implemented apart from the other aspects.

What is claimed is:

1. An automated process executed by a network server system that delivers recorded media programs to a plurality of viewers, the automated process comprising:
   recording an initial number of copies of a media program for storage by the network server system, wherein the initial number of copies is based upon a number of recording timers set for the media program by the plurality of viewers;
   after the initial number of copies of the media program have been recorded,
   subsequently receiving requests from at least some of the viewers to view a copy of the media program;
   assigning, in response to each of the subsequently-received requests, one of the previously-recorded copies to the viewer making the request to thereby permit access to the assigned copy of the media program by the viewer; and subsequently deleting at least some of the previously-recorded copies of the media program that are not yet assigned to any of the plurality of viewers.

2. The automated process of claim 1 wherein the initial number of copies is less than a number of recording times set for the media program by the plurality of viewers.

3. The automated process of claim 1 wherein at least some of the copies of the media program are transcoded into multiple adaptive streams each encoded at different quality levels.

4. The automated process of claim 3 wherein the deleting comprises deleting some, but not all, of the adaptive streams of the copy of the media program.

5. The automated process of claim 3 wherein the deleting comprises deleting the adaptive streams encoded at higher qualities before deleting the adaptive streams encoded at lower qualities.

6. The automated process of claim 1 wherein the initial copies of the media program are not assigned to specific viewers until the request is received from the specific viewer, wherein the request indicates a desire by the viewer to view the media program.

7. The automated process of claim 1 wherein the network server system is a remote storage digital video recorder (RSDVR) system that comprises a processor, non-transitory data storage and an interface to a network.

8. The automated process of claim 7 wherein the initial copies of the media program are stored in the non-transitory storage, wherein the requests are received via the network, and wherein the assigned copies of the media program are delivered to client devices as media streams via the network.

9. A network server system that delivers recorded media programs to a plurality of viewers, the system comprising a processor, non-transitory data storage and an interface to a network, wherein the non-transitory data storage comprises computer-executable instructions that, when executed by the processor, perform an automated process comprising:

recording an initial number of copies of a media program for storage by the network server system, wherein the initial number of copies is based upon a number of recording timers set for the media program by the plurality of viewers;

after the initial number of copies of the media program have been recorded, subsequently receiving requests from at least some of the viewers to view a copy of the media program;

assigning, in response to each of the subsequently-received requests, one of the previously-recorded copies to the viewer making the request to thereby permit access to the assigned copy of the media program by the viewer; and subsequently deleting at least some of the previously-recorded copies of the media program that are not yet assigned to any of the plurality of viewers.

10. The network server system of claim 9 wherein at least some of the copies of the media program are transcoded into multiple adaptive streams each encoded at different quality levels, and wherein the deleting comprises deleting some, but not all, of the adaptive streams of the copy of the media program.

11. The network server system of claim 10 wherein the deleting comprises deleting the adaptive streams encoded at higher qualities before deleting the adaptive streams encoded at lower qualities.

12. The network server system of claim 9 wherein the network server system is a remote storage digital video recorder (RSDVR) system.

13. The network server system of claim 12 wherein the requests are received via the network, and wherein the assigned copies of the media program are delivered to client devices as media streams via the network.

14. An automated process performed by a remote storage digital video recorder (RSDVR) system comprising a non-transitory data storage, a processor and an interface to a network, the automated process comprising:

initially determining a number of copies of a media program to be recorded for later viewing by a plurality of viewers having access to the RSDVR system, wherein the number of copies is based upon a number of recording timers set for the media program by the plurality of viewers;

storing the number of copies of the media program in a pooled arrangement by the RSDVR system, wherein individual copies of the media program are not assigned to a specific viewer at the time of storage;

after the number of copies are stored, subsequently responding to requests from the plurality of viewers, wherein the requests indicate a desire to obtain access to a copy of the media program stored by the RSDVR system;

responding to each of the requests by performing, by the RSDVR system, a late assignment in which one of the copies in the pooled arrangement is assigned to the viewer making the request to thereby provide the viewer with access to the assigned copy of the media program; and subsequently deleting at least some of the previously-recorded copies of the media program that are not yet assigned to any of the plurality of viewers.

15. The automated process of claim 14 wherein at least some of the copies of the media program are transcoded into multiple adaptive streams each encoded at different quality levels.

16. The automated process of claim 15 wherein the deleting comprises deleting some, but not all, of the adaptive streams of the copy of the media program.

17. The automated process of claim 15 wherein the deleting comprises deleting the adaptive streams encoded at higher qualities before deleting the adaptive streams encoded at lower qualities.

* * * * *